United States Patent Office 2,699,800
Patented Jan. 18, 1955

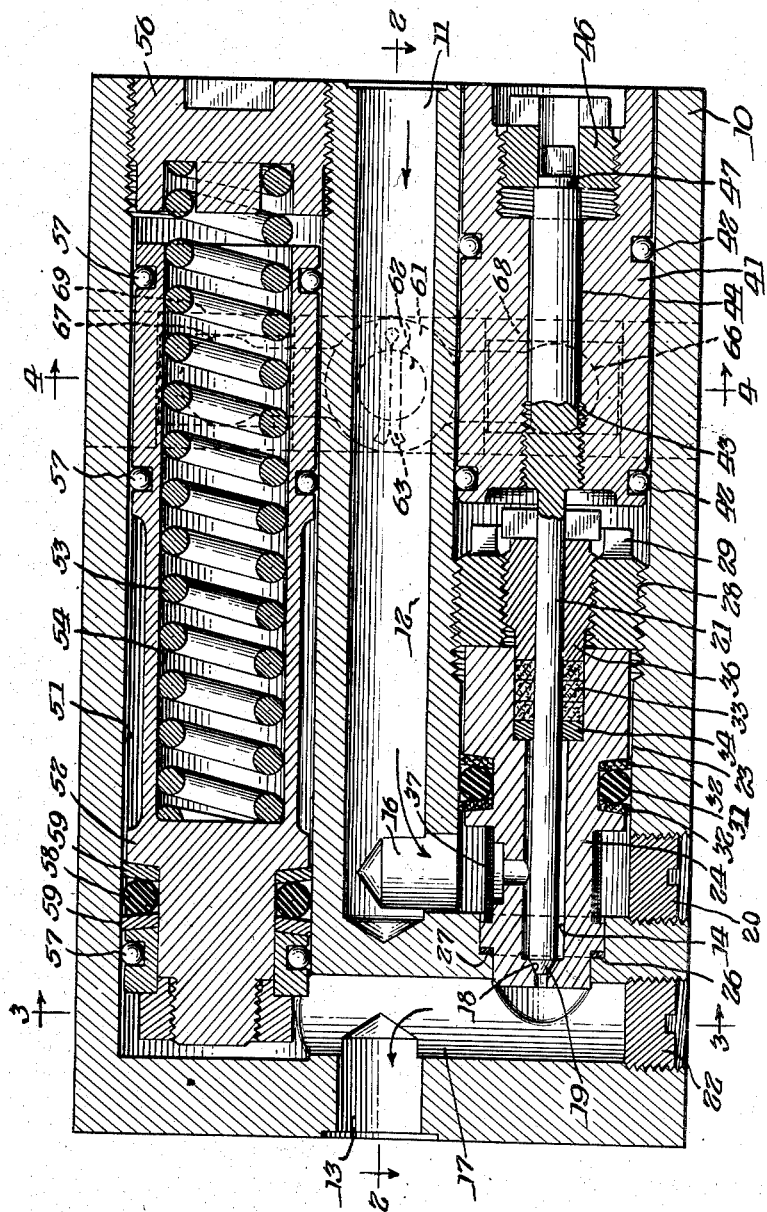

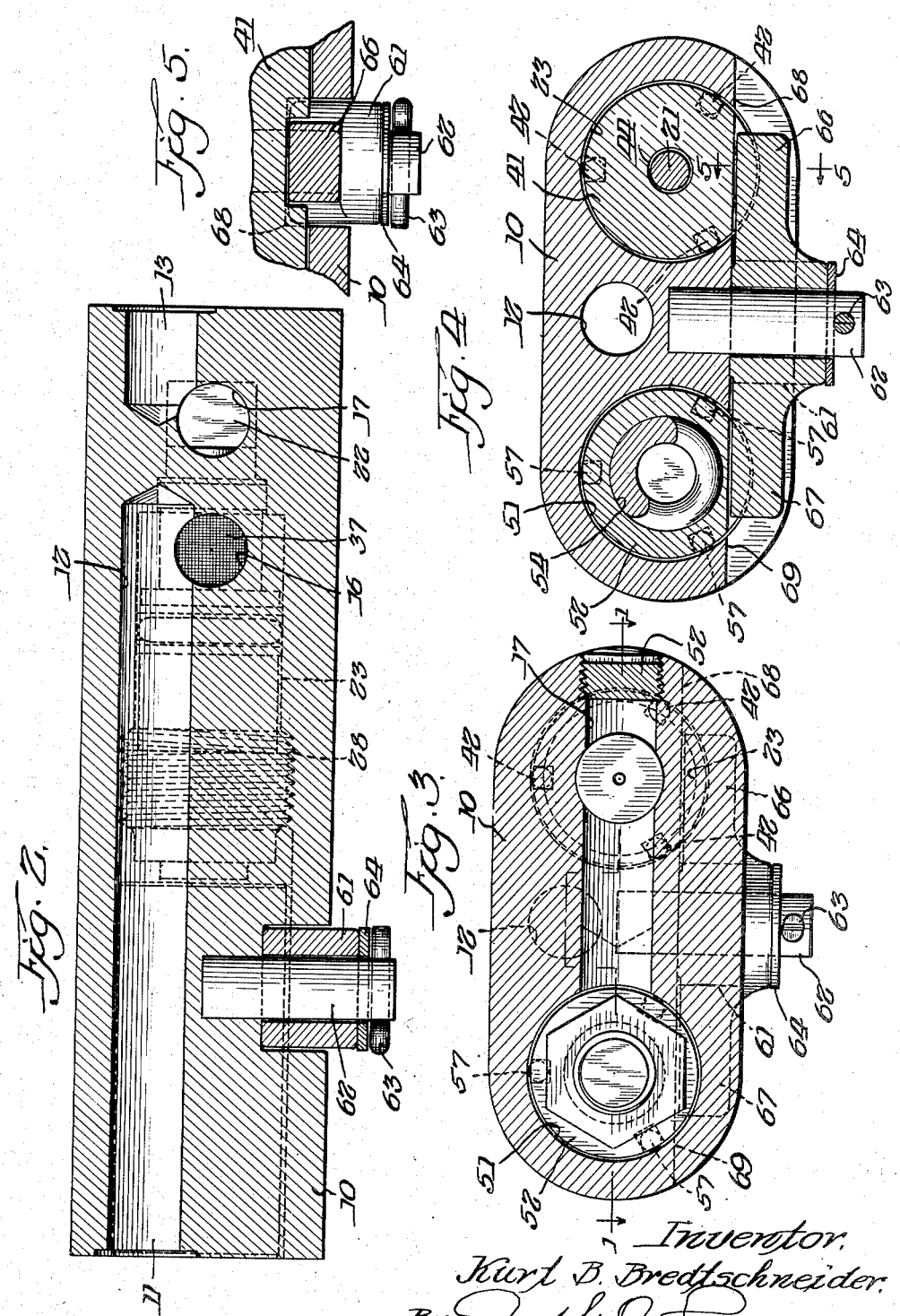

2,699,800

FLUID PRESSURE REGULATOR

Kurt B. Bredtschneider, Chicago, Ill., assignor to Crane Co., Chicago, Ill., a corporation of Illinois Application May 17, 1951, Serial No. 226,806

5 Claims. (Cl. 137—505.47)

This invention pertains to a fluid pressure regulator, and, more especially, it applies to a fluid pressure regulator which is bodily accelerated rapidly, as, for example, possessing the high rate of acceleration encountered in the flight of a guided missile.

It is an important object of this invention to provide a fluid pressure regulator which will accurately and sensitively control the fluid being regulated or the outlet pressure therefrom.

It is another object of this invention to provide a fluid pressure regulator which is not adversely affected in its operation even when bodily accelerated in motion.

Another object of this invention is to provide a fluid pressure regulator which will be suitable for relatively high fluid pressures while being made compact in size and light in weight.

Other objects and advantages will become more readily apparent upon proceeding with the following description read in light of the accompanying drawings, in which Fig. 1 is a sectional assembly view taken substantially on the vertical center line of a preferred embodiment of this invention, per Fig. 3.

Fig. 2 is a sectional view taken on the line 2—2 of Fig. 1.

Fig. 3 is a sectional view taken on the line 3—3 of Fig. 1.

Fig. 4 is a sectional view taken on the line 4—4 of Fig. 1.

Fig. 5 is a fragmentary sectional view taken on the line 5—5 of Fig. 4.

Similar reference numerals refer to similar parts throughout the several views.

As shown in Fig. 1, the pressure regulator structure generally comprises a casing 10 having a fluid inlet 11, with a substantially centrally located fluid passageway 12, and a fluid outlet 13. In the operation of this regulator, it is intended that a fluid supply source (not shown) be connected to the casing inlet 11 to maintain a relatively high inlet pressure, while the fluid pressure in the outlet 13 is regulated by a novel intermediate means hereinafter to be described. It should be noted that the passageway 12 communicates with outlet 13 by means of a throughway or bore 14 shown to extend parallel to passageway 12 with interconnecting passages 16 and 17 extending between the passageway 12 and the outlet 13, respectively, and transverse thereto, the passages 16 and 17 for convenience preferably being bored within the casing 10 and then sealed by the plugs 20 and 22, respectively. The foregoing described fluid passage arrangement and its relation to the latter is also apparent in Fig. 2.

The casing 10 is provided with a bore 23 which receives in one end thereof a centerpiece member 24 containing therewithin the bore 14 and having a shoulder 26 which compresses a gasket 27 against the end limit of the bore 23. A central inner portion of the bore 23 contains a threaded portion 28 into which a locknut 29 is engaged to maintain the centerpiece 24 in position. Also, for sealing purposes, an O-ring 31 is preferably positioned in an outer peripheral groove located in the centerpiece 24 and defined by back-up rings 32 made preferably of leather or the like. The O-ring 31 thereby effects a fluid seal between the fluid flow passages described and the outer portion of the bore 23. With the foregoing description in mind, it should also be noted that the centerpiece 24 is stationary in its positioning within the casing.

As shown more clearly in Fig. 1, the centerpiece 24 is provided with a valve seat 18 formed by a reduced axial opening at the end of the bore 14 and located adjacent the passage 17. It is preferred that the seat 18 be of a frusto-conical configuration for the purpose of throttling the fluid flow therethrough with a similarly shaped valve closure member 19 which is preferably shown as an integral end portion of an elongated stem 21 extending axially through the bore 14. A stem packing material 33 surrounds a portion of the stem 21 between a packing ring 34 and a gland 36, with the latter member threadedly engaged within the locknut 29. Thus, it should be apparent that the gasket 27, the O-ring 31, and the packing 33 fluid tightly seal the centerpiece 24 with its related parts, thereby restricting the fluid flow through the bore 14 as desired. It should also be noted that a screen 37 is preferably positioned around the centerpiece 24 to filter the fluid flowing through the regulator in transverse passage 16.

Figs. 1 and 4 also show the bore 23 arranged to contain a piston 41 which is preferably mounted therein on a plurality of ball bearings 42 peripherally spaced on the piston 41 to provide for easy reciprocal motion of the piston within the bore with a minimum of friction. The piston 41 is preferably threaded in its axial bore 44 to engage a rearwardly extended threaded end 43 of stem 21 which extends through the bore 44. Thus, it should be apparent that displacement of piston 41 will correspondingly displace the stem 21 and operate the valve 19 to selectively interrupt and throttle fluid flow through the bore 14. Since the stem 21 extends through the piston bore 44, it is readily accessible from the exterior of the casing 10, while a locknut 46 threadedly engages the bore 44 to abut a rearward stem shoulder 47 thereby to lock the stem in the desired position on the piston 41.

In considering the means of operating the piston 41 and thus effect similar movement of the valve 19, reference is had to the opposite side of casing 10, wherein a bore 51 is located parallel to the bore 23. Disposed within the bore 51 to be movable reciprocally therewithin is a piston 52 which projects into the passage 17 as the latter extends transversely in the casing 10. It should thus be obvious that the regulated fluid pressure in the passage 17 acts on the projected end of piston 52. The latter member is yieldingly urged into passage 17 by means of a compression coil spring 53 which is preferably mounted within an axial bore 54 of the piston 52 and is secured in assembly by abutting a plug 56 which is threadedly positioned into the bore 51 of the casing 10. Since the plug 56 is engaged in an extended threaded portion in the casing 10, the plug can be selectively positioned along the bore 51 and thereby provide for adjustment of the compression on the spring 53.

The piston 52 is preferably mounted similarly within the bore 51 on a plurality of ball bearings 57 which promote the easy reciprocal displacement of the piston 52 and the axial alignment thereof. Also mounted around the outer periphery of the piston 52 in a groove defined by rings 59 made preferably of leather or the like, is an O-ring 58 effecting a fluid seal from passage 17 to exterior of casing 10.

As shown in the dotted lines in Fig. 1 and in section in Figs. 2 and 4, a rocker arm 61 is rotatably mounted on a post 62, being preferably press-fitted into and projecting from a central location on the casing 10 with a pin 63 to maintain the rocker arm 61 on the post 62 through a bearing washer 64. The oppositely extending ends 66 and 67 of the rocker arm 61 respectively engage slots 68 and 69 in pistons 41 and 52 thereby to transmit the motion of one piston in an opposite direction to the other piston. Fig. 5 shows more clearly the foregoing described connection of the rocker arm ends 66 with the piston 41 wherein the slot 68 receives the end 66 within end limits of the slot length. A similar connection is made with the rocker arm end 67 and slot 69 in piston 52.

In view of the foregoing description of the pressure regulator construction, the following description is concerned with the operation thereof. As previously stated, the outlet or the regulated fluid pressure in the passage 17 acts upon the piston 52 and, depending upon other forces hereinafter considered, displaces the piston 52 rearwardly (to the right) to compress the spring 53. As the piston 52 is displaced, the rocker arm 61 is rotated through motion of the rocker arm end 66 which imparts an equal but opposite motion to the rocker arm end 67 and the connected piston 41. The latter motion of the piston 41 in turn operates the valve 19 thereby to seat the latter as previously described.

Thus, assuming that a given constant fluid outlet or regulated pressure is desired, the spring 53 is adjusted for that desired pressure by properly positioning plug 56 and the following valve operation is performed upon the occurrence of the fluid pressure being regulated. The force on the piston 52 exerted by the fluid pressure must be initially calculated to balance the resisting force applied by the spring 53 including, of course, consideration of all frictional forces acting throughout the regulator. Now, assuming that the regulated pressure drops below the required pressure, an operation reverse to that described above will be effected, that is to say, the piston 53 will move forward into the passage 17 to actuate the rocker arm 61 and correspondingly move the piston 41 rearwardly (to the right) to unseat the valve 19. Then, with the valve open, fluid pressure is admitted into outlet 13 through the bore 14 until the desired regulated pressure is reached and the piston 52 is thereby moved rearwardly to close valve 19.

From the foregoing description of the regulator, it will be understood that the effects of inertia on the movably mounted parts thereof, when the entire device is subjected to acceleration, will be balanced by the movable parts connected to the opposite ends of the rocker arm. Such a balanced effect, of course, requires that the weight of the parts connected to one end of the rocker arm equals the weight of the parts connected to the opposite end of the rocker arm.

Thus, the rocker arm performs the dual function of operating the valve in response to the fluid pressure being regulated and in balancing the inertia effect, on the movably mounted parts, when the regulator is bodily accelerated.

It should thus be apparent that there has been invented a practical fluid pressure regulator adaptable for use under unusual operating conditions, and, although this invention is shown and described in a single form, it is susceptible to numerous changes, and should, therefore, be limited only by the spirit of this application and the scope of the appended claims.

I claim:

1. A fluid pressure regulator comprising a casing having a fluid inlet and a fluid outlet and an intermediate chamber, a fluid flow regulating member disposed within said chamber to control the flow of fluid therethrough, said casing having an auxiliary chamber therein, a fluid pressure responsive member located in said auxiliary chamber subject to the outlet pressure of said regulator, said fluid pressure responsive member and said fluid flow regulating member being restricted to movement along parallel paths, a centrally pivoted rocker arm with its ends connected to said regulating member and said fluid pressure responsive member whereby motion of said fluid pressure member causes movement of said regulating member in the opposite direction, resilient means operatively connected to said fluid pressure responsive member to thereby yieldingly position the said latter member against the influence of the said fluid outlet pressure, the said regulating member being equal in weight to the said fluid pressure responsive member to balance each other against acceleration forces.

2. A fluid pressure regulator comprising a casing having a fluid inlet and a fluid outlet and an intermediate chamber, a fluid flow regulating member disposed within said chamber to control the flow of fluid therethrough, a ported centerpiece member in the casing forming a seat for the said fluid flow regulating member, said casing having an auxiliary chamber therein, a fluid pressure responsive member located in said auxiliary chamber subject to the outlet pressure of said regulator and movable in a plane substantially parallel to the plane of movement of the said fluid flow regulating member, a centrally pivoted rocker arm cooperating with said regulating member and said fluid pressure responsive member whereby upon actuation of said fluid pressure member movement of said regulating member takes place in the opposite direction, resilient means operatively related to said fluid pressure responsive member to thereby yieldingly position said latter member against the influence of the said fluid outlet pressure, the said regulating member being equal in weight to the said fluid pressure responsive member to balance each other against acceleration forces.

3. A fluid pressure regulator comprising a casing having a fluid inlet and a fluid outlet and an intermediate chamber, a fluid flow regulating member disposed within said chamber to control the flow of fluid therethrough, said casing having an auxiliary chamber therein, the said chambers being connected by a passage directly communicating with the said casing outlet, a fluid pressure responsive member located in said auxiliary chamber subject to the outlet pressure of said regulator, the said regulating and fluid responsive members being restricted to movement in opposite directions along parallel paths, a centrally pivoted rocker arm with its ends connected to said regulating member and said fluid pressure responsive member whereby motion of said fluid pressure member causes movement of said regulating member in the opposite direction, fluid sealing means for the said regulating and fluid responsive members, resilient means cooperating with said fluid pressure responsive member to thereby yieldingly position the said latter member against the influence of the said fluid outlet pressure, the said regulating member being equal in weight to the said fluid pressure responsive member to balance each other against acceleration forces.

4. A fluid pressure regulator comprising a casing having a fluid inlet and a fluid outlet and an intermediate chamber, a fluid flow regulaing member disposed within said chamber to control the flow of fluid therethrough, said casing having an auxiliary chamber therein, a fluid pressure responsive member located in said auxiliary chamber subject to the outlet pressure of said regulator, said fluid pressure responsive member and said fluid flow regulating member being restricted to movement in opposite directions along parallel paths, a centrally pivoted rocker arm between said chambers and having oppositely disposed end portions cooperating with said regulating member and said fluid pressure responsive member whereby motion of said fluid pressure member causes movement of said regulating member in the opposite direction, piston means for guiding the said fluid flow regulating member, resilient means operatively connected to said fluid pressure responsive member to thereby yieldingly position the said latter member against the influence of the said fluid outlet pressure, the said regulating member being substantially equal in weight to the said fluid pressure responsive member to balance each other against acceleration forces.

5. A fluid pressure regulator comprising a casing having a fluid inlet and a fluid outlet and an intermediate chamber, a fluid flow regulating member disposed within said chamber to control the flow of fluid therethrough, said casing having an auxiliary chamber therein and a transversely extending passage connecting the said chambers with the casing outlet, a fluid pressure responsive member located in said auxiliary chamber subject to the outlet pressure of said regulator, said fluid pressure responsive member and said flow regulating member being restricted to movement along parallel paths, a centrally pivoted rocker arm with end portions cooperating with said regulating member and said fluid pressure responsive member whereby motion of said fluid pressure member causes movement of said regulating member along the path in the opposite direction, resilient means cooperating with said fluid pressure responsive member to thereby yieldingly position the said latter member against the influence of the said fluid outlet pressure, the said regulating member being equal in weight to the said fluid pressure responsive member to balance each other against acceleration forces, the said flow regulating member and the said pressure responsive member being engageable by the said rocker arm and being substantially in equilibrium when the regulator is bodily accelerated.

References Cited in the file of this patent

UNITED STATES PATENTS

| Number | Name | Date |
|---|---|---|
| 80,066 | Gibson | July 21, 1868 |
| 311,747 | Hambay | Feb. 3, 1885 |
| 405,533 | Connedy | June 18, 1889 |
| 547,742 | Rudolph | Oct. 8, 1895 |
| 1,271,062 | Murphy | July 2, 1918 |
| 1,858,084 | Heidbrink | May 10, 1932 |

FOREIGN PATENTS

| Number | Country | Date |
|---|---|---|
| 9,755 | Great Britain | 1891 |
| 14,503 | Austria | 1903 |